United States Patent [19]

Cycon et al.

[11] Patent Number: 4,466,774
[45] Date of Patent: Aug. 21, 1984

[54] COMPOSITE FLEXBEAM JOINT

[75] Inventors: James P. Cycon, Milford; Timothy A. Krauss, Horwinton; Stephan Roman, Shelton, all of Conn.

[73] Assignee: United Technologies Corporation, Hartford, Conn.

[21] Appl. No.: 413,029

[22] Filed: Aug. 30, 1982

[51] Int. Cl.³ .............................................. B64C 27/48
[52] U.S. Cl. ................................. 416/134 A; 416/138
[58] Field of Search ............... 416/134 A, 138 A, 141, 416/226, 230 A, 135 B

[56] References Cited

U.S. PATENT DOCUMENTS

| 3,321,019 | 5/1967 | Dmitroff et al. | 416/230 A X |
|---|---|---|---|
| 3,950,115 | 4/1976 | Euler | 416/226 |
| 4,086,024 | 4/1978 | Weiland et al. | 416/140 |
| 4,111,605 | 9/1978 | Roman et al. | 416/138 A X |
| 4,120,610 | 10/1978 | Braswell et al. | 416/230 A X |
| 4,195,967 | 4/1980 | Weiland | 416/134 A |
| 4,247,255 | 1/1981 | De Rosa | 416/230 A X |
| 4,255,087 | 3/1981 | Wackerle et al. | 416/134 A X |
| 4,266,912 | 5/1981 | Roman | 416/138 A X |
| 4,273,511 | 6/1981 | Mouille et al. | 416/134 A |
| 4,321,013 | 3/1982 | Schwarz et al. | 416/244 R |

FOREIGN PATENT DOCUMENTS 1166700 10/1969 United Kingdom ........... 416/134 A

Primary Examiner—Everette A. Powell, Jr.
Attorney, Agent, or Firm—Russell M. Lipes, Jr.

[57] ABSTRACT

A helicopter rotor system using composite flexbeams for connecting a rotor blade to the rotor hub, each flexbeam being of C-section and having a web section made up of 0° and ±45° plies and top and bottom flanges made up of low angle plies in the direction of their length with their ends being connected by an arc of plies so that the top and bottom flange plies are continuous with an attachment fitting encased at the ends of the flexbeams.

11 Claims, 7 Drawing Figures

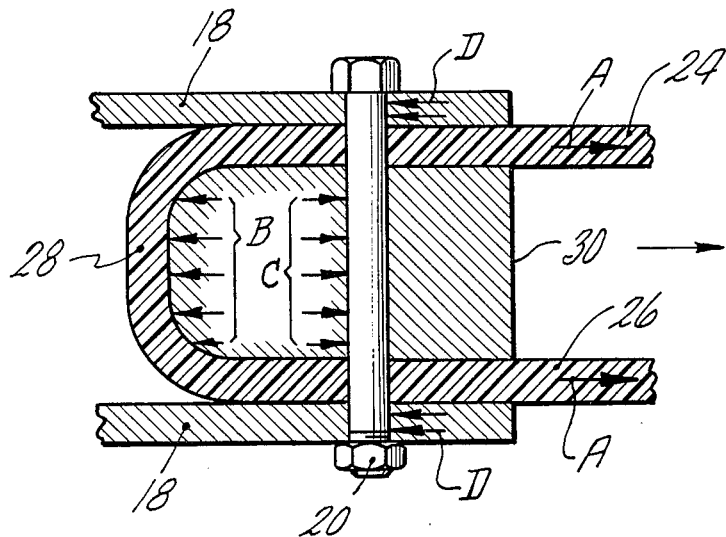
Fig. 4  AXIAL LOADING (CENTRIFUGAL LOAD)
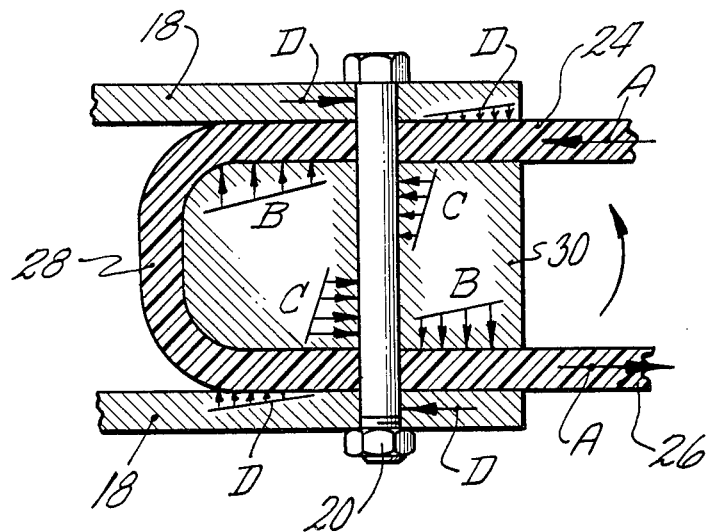
Fig. 5  FLAPWISE MOVEMENT LOADING (OUT-OF-PLANE MOVEMENT)

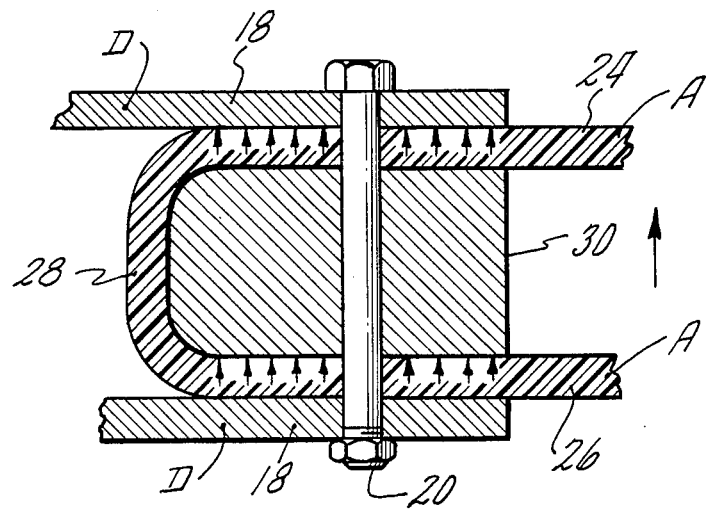
Fig. 6 FLAPWISE SHEAR LOADING
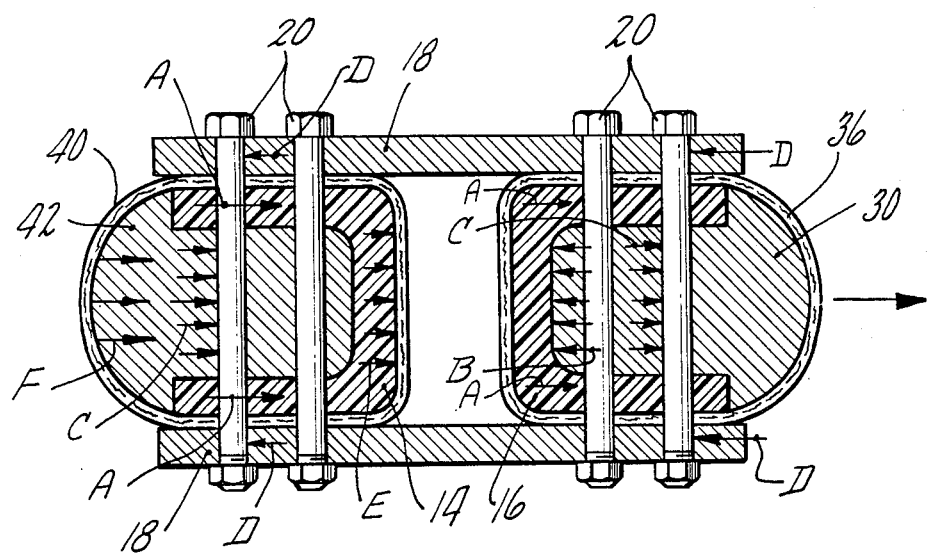
Fig. 7 CHORDWISE SHEAR LOADING (INPLANE LOAD)

COMPOSITE FLEXBEAM JOINT

The invention was conceived or first actually reduced to practice under a Department of Army contract.

DESCRIPTION

1. Technical Field

This invention relates to composite flexbeams for helicopter rotors and more particularly to a flanged composite flexbeam in which the flanges are continuously wrapped around fittings at each end of the beam to provide, with the flexbeam web, encapsulated end joints which are an integral part of the beam structure.

2. Background Art

A current method of obtaining articulation on state-of-the-art helicopter rotors is the bearingless approach whereby rotor blades are mounted on composite flexbeams rigidly attached to the rotor shaft. There is a joint between the flexbeam and the shaft and between the flexbeam and the blade. The flexbeams are tailored to meet the required bending stiffness at a minimum torsional stiffness and are believed to be the preferred approach for forthcoming generation rotors.

Typically root end joints of composite flexbeams are fabricated by building up the beam laminates in the joint area to near-solid sections and to bolt through them. These types of joints are inefficient and difficult to fabricate for large rotors due to the high laminate thickness required, and result in highdrag structures and the numerous ply endings cause shear stress problems.

Roman et al. U.S. Pat. No. 4,111,605 shows a crossbeam rotor structure having C-shaped straps with thrubolt attachment of the rotor blades at the outer ends. Delker U.S. Pat. No. 3,434,372 shows a helicopter rotor system employing a laminated coupler with end fittings between a rotor blade and a hub. Mouille U.S. Pat. No. 4,104,003 shows a helicopter rotor system employing a beam carrying two opposite blades.

DISCLOSURE OF INVENTION

An object of the present invention is the provision of a composite flexbeam construction for helicopter bearingless rotors which is relatively easy to fabricate and which provides efficient joints for the attached members.

Another object of the invention is to provide a composite flexbeam for helicopter rotors which has a minimum thickness in the joint area and requires no time consuming, difficult to inspect and manufacture, laminate build-ups.

A further object of the invention is to provide a composite flexbeam for helicopter rotors using continuous windings and minimizing the problem of ply endings.

Still another object of the invention is to provide a bolt attachment for a composite flexbeam which can transfer loads by means of an encased fitting without a direct structural load path between the bolts and the composite.

The foregoing and other objects, features and advantages will be apparent from the specification and claims and from the accompanying drawings which illustrate an embodiment of the invention.

BRIEF DESCRIPTION OF THE DRAWINGS

FIG. 4 is a load transfer path diagram for an axial (centrifugal) loading.

FIG. 5 is a load transfer path diagram for a flapwise moment (out-of-plane) loading.

FIG. 6 is a load transfer path diagram for a flapwise shear loading.

FIG. 7 is a load transfer path diagram for a chordwise shear (inplane) loading when a hoop winding has been employed with the flexbeam structure.

BEST MODE FOR CARRYING OUT THE INVENTION

Figure 1:
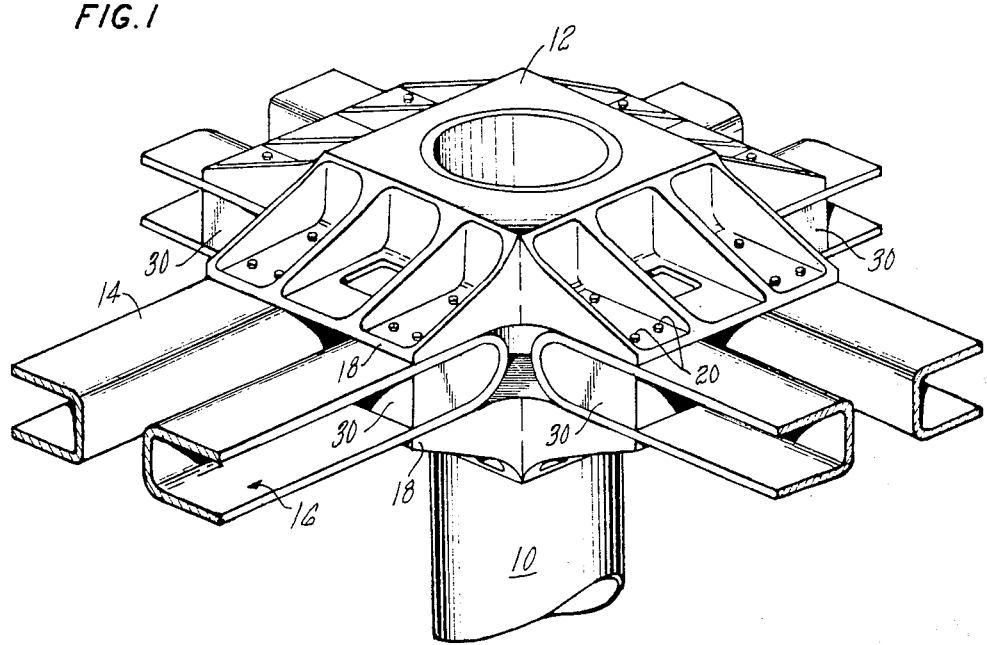
FIG. 1 is a fragmentary, sectional view of a helicopter rotor hub showing connections to flexbeams in accordance with this invention.

In FIG. 1, a helicopter rotor shaft 10 is shown which is connected to and drives hub 12 to which are attached pairs of flexbeams at 90° spacing, one pair of the flexbeams being shown at 14 and 16. A rotor blade would be attached to the outer end of each pair of flexbeams, but this is not shown. Each flexbeam is attached to a cuff 18 on the hub by thru-bolts 20.

Figure 2:
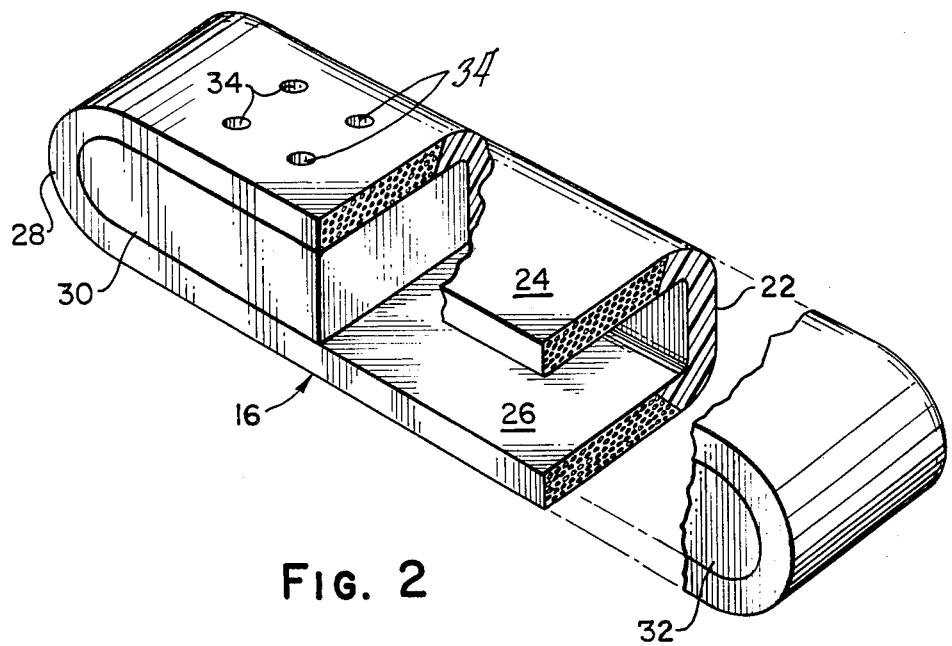
FIG. 2 is an enlarged fragmentary section of one end of a flexbeam.

The details of one of the flexbeams, such as flexbeam 16, are shown in FIG. 2. Each flexbeam is essentially of C-section and consists of a web, a top flange, a bottom flange, and a fitting at either end encased within the top and bottom flanges and the web. Web 22 is a composite structure made up of 0° and ±45° plies and carries shear loads. Top flange 24 and bottom flange 26, which carry primary loads, are constructed with essentially low angle plies in the direction of their length with their ends being joined as at 28 with a continuous wrap-around forming an arc or curved section. Fitting 30, basically a rectangular block with a rounded end, and typically metallic, is surrounded on its top and bottom surface and its rounded end by the continuous wrap of the top and bottom flanges and on one side surface by web 22. There is another fitting 32 similarly disposed at the other end of the flexbeam. The web, flanges and fittings are cured together as a unitary member to act as a complete structure. Holes 34 are provided through each end of the flexbeam for receiving attachment bolts, such as bolts 20.

Since the low angle plies at the ends of the flexbeam are continuous around the fittings, a degree of continuity and redundancy is provided in the end attachment areas. Also, with no ply endings associated shear stresses are eliminated. The plies in the web are tapered off at each end of the flexbeam along the side of the end fitting so as to shear gradually through the fitting.

Figure 3:
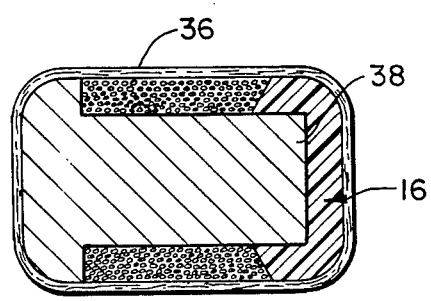
FIG. 3 is a transverse section through a hoop wrapped end of a flexbeam.

To more positively contain the fitting within the flexbeam, particularly against higher inplane loads in either direction, a thin hoop wrap may be performed around the fitting at the completion of the fabrication process as shown at 36 in FIG. 3. Here fitting 38 is dome shaped to present a smoother perimeter for the hoop wrap. It also may be desirable in some instances to wrap plies from the web around an end 28 of flexbeam 16, the plies being intermixed with flange plies. This integration of plies around the fitting provides for better load sharing.

While the flexbeam has been described and shown as essentially a C-section member, it is possible that two flexbeams could be located web-to-web to constitute an I-section with web and flange plies being intermixed to some degree to form a unitary structure. For example, flexbeams 14 and 16 could be moved together to eliminate the spacing shown and the ply wrappings intermixed to form a unitary member.

The flexbeam construction is such that the transfer of bending moments, the axial forces and shear loads are accommodated without a direct structural load path between the composite flexbeam and the clamping bolts. The load on the flexbeam is essentially compressive which is a major advantage of the joint since composites have relatively good compression strength. Typically joints use shear as a major load reaction which is an inefficient way in composite materials.

The loads imposed upon the composite flexbeam of a bearingless rotor are axial (centrifugal), inplane, out-of-plane bending and shear plus a torsional twisting load. With respect to an axial (centrifugal) load imposed upon the rotor hub end of a flexbeam, as shown in FIG. 4, the flexbeam load A would be reacted, as at B, by the rounded end of fitting 30, the fitting load would be reacted, as at C, by bolt 20, or bolts, and the bolt load would be reacted, as at D, by hub cuff 18. There is thus no direct reaction between the composite structure of the flexbeam and the bolt. Similarly, flap moment, flap shear (lift) and chordwise (inplane) loads are reacted with no direct reaction between the flexbeam and the bolt. This is shown in FIGS. 5, 6 and 7.

FIGS. 5 and 6 show the load transfer from the composite flexbeam A to the fitting B into the bolts C and then reacted D by the hub cuff, for both flapwise moment and flapwise shear (lift) loading. In the case of flapwise shear loading, the transfer is essentially into the upper cuff with some shear being through the web of the flexbeam. FIG. 7 shows the reaction of chordwise shear loading with a hoop wrap fitting with a pair of flexbeams 14 and 16. As shear loading is applied to the right, the right flexbeam 16 transfers the load by direct bearing B on fitting 30 which in turn transfers the load C to bolts 20 and the load is reacted D by the hub cuffs. In the left flexbeam 14, the load A from the beam is transferred, as at E, into hoop winding 40 and through the hoop winding, as at F, into fitting 42, the loading then being reacted by bolts 20, as at C, and finally by the hub cuffs as at D.

It is to be understood that the invention is not limited to the particular embodiment shown and described herein, but that various changes and modifications may be made without departing from the spirit or scope of this concept as defined by the following claims.

We claim:

1. A helicopter rotor having a flexbeam attaching each rotor blade to the rotor hub, in which the flexbeam is generally of C-section and has a web and top and bottom flanges, the top and bottom flanges at at least one end of the flexbeam being connected by an arc section, a fitting at that end encased within the web, top and bottom flanges and arc section, and at least one attachment hole extending through said flanges and said fitting.

2. A flexbeam construction for a helicopter rotor in accordance with claim 1 in which the fitting is metallic.

3. A flexbeam construction for a helicopter rotor in accordance with claim 1 in which both ends of the flexbeam are connected by arc sections and have fittings encased therein.

4. For a helicopter rotor system, a flexbeam for connecting rotor blades to a rotor hub, said flexbeam being of composite material and having a web constructed of multi-directional plies and top and bottom flanges constructed of essentially low angle plies with the ends of each top and bottom flange being connected by an arc shape so that the low angle plies are continuous, a fitting at at least one end of said flexbeam and surrounded in part by said web and said flanges, and attachment holes through said flanges and said fitting.

5. A helicopter rotor in accordance with claim 4 in which the fitting is metallic.

6. A helicopter rotor system flexbeam in accordance with claim 4 in which the fitting has top and bottom surfaces and a rounded end encased by the low angle plies of the flexbeam flanges.

7. A helicopter rotor in accordance with claim 4 in which plies are wrapped around the fitting to form a hoop wrap.

8. A helicopter rotor in accordance with claim 4 in which the fitting has a face encased by the plies of the flexbeam web.

9. A helicopter rotor in accordance with claim 4 in which there is a fitting at each end of said flexbeam.

10. A helicopter rotor in accordance with claim 8 in which the fitting has a face opposite the web encased face which is dome shaped.

11. A helicopter rotor in accordance with claim 10 in which the dome shaped face of the fitting is wrapped with plies forming a hoop around the fitting.

* * * * *